United States Patent
Jang et al.

(10) Patent No.: US 10,978,021 B2
(45) Date of Patent: *Apr. 13, 2021

(54) PORTABLE TERMINAL CAPABLE OF CONTROLLING DISPLAY BRIGHTNESS AND METHOD FOR CONTROLLING DISPLAY BRIGHTNESS THEREOF

(71) Applicant: Samsung Electronics Co., Ltd., Gyeonggi-do (KR)

(72) Inventors: Woo-Seok Jang, Gyeongsangbuk-do (KR); Jin-Sung Park, Gyeongsangbuk-do (KR); Hyong-Sog Oh, Gyeongsangbuk-do (KR); Ji-Hwa Kim, Gyeongsangbuk-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/253,969

(22) Filed: Jan. 22, 2019

(65) Prior Publication Data

US 2019/0156787 A1    May 23, 2019

Related U.S. Application Data

(63) Continuation of application No. 15/406,082, filed on Jan. 13, 2017, now Pat. No. 10,186,233, which is a
(Continued)

(30) Foreign Application Priority Data

Jun. 9, 2005    (KR) .................. 10-2005-0049300

(51) Int. Cl.
*G06F 3/041* (2006.01)
*G09G 5/10* (2006.01)
(Continued)

(52) U.S. Cl.
CPC .................. *G09G 5/10* (2013.01); *G06F 3/02* (2013.01); *G06F 3/041* (2013.01);
(Continued)

(58) Field of Classification Search
CPC .... G09G 3/3406; G09G 2320/06; G06F 3/02; G06F 3/04847; G06F 3/041
See application file for complete search history.

(56) References Cited

U.S. PATENT DOCUMENTS 5,671,014 A * 9/1997 Ito ...................... H04N 5/232
345/173
5,900,877 A    5/1999 Weiss et al.
(Continued)

FOREIGN PATENT DOCUMENTS

CN    1123509    5/1996
CN    1661663    8/2005
(Continued)

OTHER PUBLICATIONS

Creston Remote Control Series 3500: ColorTouch & VideoTouch, Touchpanels Operation Guide (Year: 1998).*
(Continued)

*Primary Examiner* — Towfiq Elahi
(74) *Attorney, Agent, or Firm* — The Farrell Law Firm, P.C.

(57) ABSTRACT

A portable terminal is provided, which includes a display, and a processor configured to receive a first user input for controlling a brightness of the display, control the display to display an indicator at a first position based on the first user input and control the brightness of the display based on a first brightness step corresponding to the first position, receive a second user input for controlling the brightness of the display, and control the display to display the indicator at a second position which is different from the first position
(Continued)

based on the second user input, without displaying the indicator at any intermediate position between the first position and the second position and change the brightness of the display based on a second brightness step corresponding to the second position. A shape and size of the indicator displayed at the first position corresponds to the shape and the size of the indicator displayed at the second position.

23 Claims, 4 Drawing Sheets

Related U.S. Application Data continuation of application No. 13/243,497, filed on Sep. 23, 2011, now Pat. No. 9,548,041, which is a continuation of application No. 11/340,617, filed on Jan. 27, 2006, now Pat. No. 9,318,074.

(51) Int. Cl.
  *G09G 3/34* (2006.01)
  *H04M 1/22* (2006.01)
  *H04W 52/02* (2009.01)
  *G06F 3/02* (2006.01)
  *G06F 3/0484* (2013.01)
  *H04M 1/725* (2021.01)

(52) U.S. Cl.
  CPC ....... *G06F 3/04847* (2013.01); *G09G 3/3406* (2013.01); *H04M 1/22* (2013.01); *H04W 52/027* (2013.01); *G09G 2320/06* (2013.01); *G09G 2320/0626* (2013.01); *H04M 1/72583* (2013.01); *Y02D 30/70* (2020.08)

(56) References Cited

U.S. PATENT DOCUMENTS

| | | | |
|---|---|---|---|
| 5,987,336 | A | 11/1999 | Sudo et al. |
| 6,392,638 | B2 | 5/2002 | Hanajima et al. |
| 6,785,595 | B2 | 8/2004 | Kominami et al. |
| 6,795,097 | B1 | 9/2004 | Yamaguchi |
| 6,891,525 | B2 | 5/2005 | Ogoro |
| 7,038,810 | B1 | 5/2006 | Yamazoe et al. |
| 7,280,850 | B2 | 10/2007 | Hama et al. |
| 7,605,829 | B2 | 10/2009 | Oh |
| 2001/0013854 | A1 | 8/2001 | Ogoro |
| 2003/0022699 | A1 | 1/2003 | Lin |
| 2003/0081005 | A1 | 5/2003 | Lin et al. |
| 2004/0012556 | A1 | 1/2004 | Yong et al. |
| 2005/0043831 | A1 | 2/2005 | Baudisch |
| 2005/0054384 | A1 | 3/2005 | Pasquale et al. |
| 2005/0151716 | A1 | 7/2005 | Lin |
| 2005/0183040 | A1 | 8/2005 | Kondo et al. |

FOREIGN PATENT DOCUMENTS

| | | |
|---|---|---|
| CN | 1680999 | 10/2005 |
| GB | 2 403 096 | 12/2004 |
| JP | 2000-324239 | 11/2000 |
| JP | 2003-032357 | 1/2003 |
| JP | 2004274570 | 9/2004 |
| KR | 10199951191 | 7/1999 |
| KR | 10-2005-0020665 | 3/2005 |
| TW | 578891 | 3/2004 |
| TW | I222338 | 10/2004 |
| WO | WO 00/41378 | 7/2000 |

OTHER PUBLICATIONS

U.S. Office Action dated Jan. 24, 2018 issued in counterpart U.S. Appl. No. 13/715,718, 39 pages.
Crestron Remote Control Systems, Crestron Series 3500: ColorTouch & VideoTouch, Touchpanels Operations Guide, Apr. 1998, 24 pages.
Chinese Office Action dated Jun. 1, 2018 issued in counterpart application No. 201510373708.6, 17 pages.
Alan Simpson, Brian Underdahl, "Windows XP Bible", 2001, Hungry Minds, p. 371.
Cheryl Price, "Learning Microsoft Windows XP", 2003, p. 78.
Steve Johnson, "Show Me Microsoft Windows XP", 2004, pp. 228-229.
European Search Report dated Oct. 25, 2006 issued in counterpart application No. 06003281.0.
Korean Office Action dated Mar. 14, 2006 issued in counterpart application No. 10-2005-0049300.
Sony Ericsson T230—User Manual—Second Edition (2004), XP 055387013, Jan. 1, 2004, 74 pages.
European Search Report dated Jul. 18, 2017 issued in counterpart application No. 17164973.7-1972, 10 pages.
Chinese Office Action dated Dec. 3, 2019 issued in counterpart application No. 201510373708.6, 21 pages.
U.S. Office Action dated Jan. 16, 2020 issued in counterpart U.S. Appl. No. 13/715,718, 35 pages.

\* cited by examiner

PORTABLE TERMINAL CAPABLE OF CONTROLLING DISPLAY BRIGHTNESS AND METHOD FOR CONTROLLING DISPLAY BRIGHTNESS THEREOF

PRIORITY

This application is a continuation of U.S. patent application Ser. No. 15/406,082, which was filed in the U.S. Patent and Trademark Office (USPTO) on Jan. 13, 2017, which is a continuation of U.S. patent application Ser. No. 13/243,497, which was filed in the USPTO on Sep. 23, 2011, issued as U.S. Pat. No. 9,548,041 on Jan. 17, 2017, which is a continuation of U.S. patent application Ser. No. 11/340,617, which was filed in the USPTO on Jan. 27, 2006, issued as U.S. Pat. No. 9,318,074 on Apr. 19, 2016, and claims priority under 35 U.S.C. § 119(a) to Korean Patent Application Serial No. 10-2005-0049300, which was filed in the Korean Intellectual Property Office on Jun. 9, 2005, the entire disclosure of each of which is incorporated herein by reference.

BACKGROUND

1. Field of the Invention

The present invention relates to a portable terminal. More particularly, the present invention relates to a portable terminal capable of controlling a backlight and a method for controlling a backlight thereof.

2. Description of the Related Art

A conventional portable terminal having a backlight function turns on and off the backlight at a predetermined level of brightness for a period of time which is set by a user. Therefore, a user can operate the portable terminal containing the backlight function at night while using a lower illumination intensity.

The portable terminal can be programmed to set the on time of the backlight. Namely, in the case in which a user sets the on time of the backlight to thirty seconds, the portable terminal turns the backlight on for thirty seconds when the power is turned on or there are key input data, and the backlight is turned off after thirty seconds.

The backlight is generally turned on at a candela value of a predetermined brightness that is determined during the manufacturing process of the portable terminal. If a backlight of a predetermined brightness is turned on at night, however, the battery is unnecessarily consumed. Due to the low exterior illumination intensity at night, a user can see the display screen even with a backlight of a low brightness.

On the other hand, a user having a weak visual acuity may feel that the brightness of the fixed or predetermined backlight is too dark when the user uses the portable terminal at night with a low illumination intensity. In this case, if the brightness of the backlight can be made brighter, the user can operate the portable terminal more conveniently.

A need therefore exists for an improved portable terminal wherein the backlight can be controlled to reduce battery consumption or to better suit the needs of users requiring more backlight brightness than is provided by the initial manufacturers setting.

SUMMARY

Accordingly, the present invention has been made to address the above-mentioned problems, and an aspect of the present invention is to provide a portable terminal and a method for controlling a backlight.

It is another aspect of the present invention to provide a method for reducing battery consumption in a portable terminal having a backlight function.

In accordance with an aspect of the present invention, a portable terminal is provided, which includes a display; and a processor configured to receive a first user input for controlling a brightness of the display, control the display to display an indicator at a first position based on the first user input and control the brightness of the display based on a first brightness step corresponding to the first position, receive a second user input for controlling the brightness of the display, and control the display to display the indicator at a second position which is different from the first position based on the second user input, without displaying the indicator at any intermediate position between the first position and the second position and change the brightness of the display based on a second brightness step corresponding to the second position. A shape and size of the indicator displayed at the first position corresponds to the shape and the size of the indicator displayed at the second position.

In accordance with another aspect of the present invention, a portable terminal is provided, which includes a display; and a processor configured to receive a first user input for controlling a brightness of the display, control the display to display an indicator at a first position based on the first user input and control the brightness of the display based on a first brightness value corresponding to the first position, receive a second user input for controlling the brightness of the display, and control the display to display the indicator at a second position which is different the first position based on the second user input, without displaying the indicator at any intermediate position between the first position and the second position and change the brightness of the display based on a second brightness value corresponding to the second position. A shape and size of the indicator displayed at the first position corresponds to the shape and the size of the indicator displayed at the second position.

In accordance with another aspect of the present invention, a portable terminal is provided, which includes a display; and a processor configured to receive a first user input for controlling a brightness of the display, control the display to display an indicator to indicate a first position based on the first user input and control the brightness of the display based on a first brightness step corresponding to the first position, receive a second user input for controlling the brightness of the display, and control the display to display the indicator to indicate a second position which is different the first position based on the second user input, without displaying the indicator at any intermediate position between the first position and the second position and change the brightness of the display based on a second brightness step corresponding to the second position. A shape and size of the indicator displayed at the first position corresponds to the shape and the size of the indicator displayed at the second position.

BRIEF DESCRIPTION OF THE DRAWINGS

The above and other objects, features, and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EMBODIMENTS

Hereinafter, various embodiments of the present invention will be described with reference to the accompanying drawings. In the following description of the present invention, a detailed description of known functions and configurations incorporated herein is omitted for clarity and conciseness.

Figure 1:
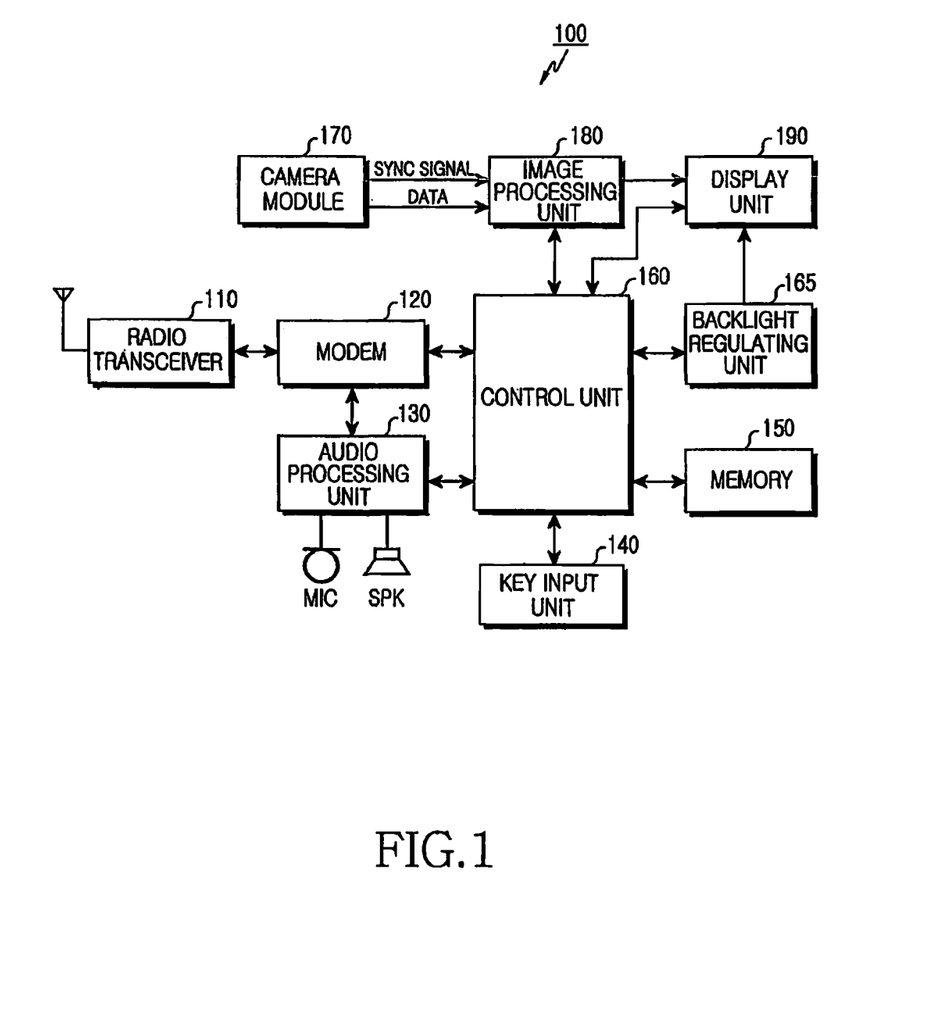
FIG. 1 is a block diagram illustrating a portable terminal according to an exemplary embodiment of the present invention.

FIG. 1 is a block diagram illustrating a portable terminal according to an exemplary embodiment of the present invention.

The portable terminal 100 comprises a radio transceiver 110, a modem 120, an audio processing unit 130, a key input unit 140, a memory 150, a control unit 160, a backlight regulating unit 165, a camera module 170, an image processing unit 180, and a display unit 190.

The radio transceiver 110 transmits and receives voice data, letter data, image data, and control data, under the control of the control unit 160. The radio transceiver 110 comprises a RF transmitter for raising and amplifying the frequencies of transmitted signals and an RF receiver for amplifying received signals with low noise and lowering the frequencies.

The modem 120 comprises a transmitter for encoding and modulating the transmitted signals and a receiver for decoding and demodulating the received signals.

The audio processing unit 130 can comprise a codec. The codec comprises a data codec for processing packet data and the like and an audio codec for processing audio signals such as voices and the like.

The audio processing unit 130 modulates the electrical signals input from a microphone and converts them to voice data, and demodulates the encoded voice data input from the radio transceiver 110 into electrical signals and outputs them to a speaker. Further, it is preferable that the audio processing unit 130 comprises a codec to convert the digital audio signals received by the radio transceiver 110 to analog signals and then reproduce them, or to convert the analog audio signals generated in the microphone to digital audio signals. The codec comprises a data codec for processing packet data and an audio codec for processing audio signals such as voices. The codec can be provided in the control unit 160.

The key input unit 140 has a key matrix structure (not shown), and comprises letter keys, number keys, function keys, and exterior volume keys to output the key input signals corresponding to the keys input by a user to the control unit 160.

The memory 150 can comprise a program memory and a data memory, and stores selected information on the basis of the information required for controlling the operation of the portable terminal 100 according to an exemplary embodiment of the present invention and the user selecting information. The memory 150 stores the backlight brightness values corresponding to the backlight steps, such as, the number and amount of incremental increases and correspondingly decreases in brightness level of a backlight that are generally preset during manufacturing of a portable terminal according to an exemplary embodiment of the present invention. The backlight brightness values preferably correspond to candela values (unit: cd) representing luminosity.

It is preferable that the memory 150 stores the backlight brightness values corresponding to the backlight steps as shown in the following Table 1 wherein an exemplary number of steps=5.

TABLE 1

| Backlight steps | 1 | 2 | 3 | 4 | 5 |
|---|---|---|---|---|---|
| Candela values (cd) | 100 | 125 | 150 | 175 | 200 |

Referring to Table 1, the backlight steps comprise five steps, and a candela value of 100 cd corresponds to the step 1 of the backlight, a candela value of 125 cd corresponds to the step 2 of the backlight, a candela value of 150 cd corresponds to the step 3 of the backlight, a candela value of 175 cd corresponds to the step 4 of the backlight, and a candela value of 200 cd corresponds to the step 5 of the backlight. Referring to Table 1, it can be seen that the backlight brightness is the brightest in step 5 and the candela value corresponding to the step 5 is the highest. On the other hand, although the backlight steps are divided into five steps in an exemplary embodiment of the present invention, they are not restricted thereto and can be divided into more or fewer steps.

On the other hand, the memory 150 can store the information in which predetermined keys correspond to the backlight steps having predetermined backlight brightness values as shown in the following Table 2.

TABLE 2

| | Backlight steps | | | | |
|---|---|---|---|---|---|
| | 1 (100 cd) | 2 (125 cd) | 3 (150 cd) | 4 (175 cd) | 5 (200 cd) |
| Corresponding Keys | Number key 1 | Number key 2 | Number key 3 | Number key 4 | Number key 5 |

Referring to Table 2, the backlight steps are divided into five steps, and the backlight step 1 whose candela value is 100 cd corresponds to the number key 1, the backlight step 2 whose candela value is 125 cd corresponds to the number key 2, the backlight step 3 whose candela value is 150 cd corresponds to the number key 3, the backlight step 4 whose candela value is 175 cd corresponds to the number key 4, and the backlight step 5 whose candela value is 200 cd corresponds to the number key 5.

Referring to Table 2, the backlight brightness is the brightest in step 5, and it is preferable that the numbers allocated to the number keys indicate the backlight steps. Although the backlight steps are divided into five steps in Table 2, they are not restricted thereto and can be divided into more or fewer steps.

The control unit 160 controls the overall operation of the portable terminal 100 according to an exemplary embodiment of the present invention. The control unit 160 stores in the memory 150 the predetermined backlight brightness values, that is, the candela values corresponding to the backlight steps. Further, the control unit 160 associates the predetermined keys, for example, the number keys, to the backlight steps having the backlight brightness values, and then stores them in the memory 150. Then, it is preferable that the control unit 160 controls the portable terminal so that the numbers allocated to the number keys correspond to the backlight steps.

If regulation of the backlight is requested by the user, the control unit 160 converts the operation mode of the portable terminal 100 to the backlight regulation mode and controls the brightness of the backlight by retrieving the backlight brightness values stored in the memory 150 so as to correspond to the backlight steps required by the user through the key input unit 140 in the backlight regulation mode. It is preferable that after converting the operation mode of the portable terminal 100 to the backlight regulation mode, the control unit 160 controls the portable terminal so that the display unit 190 displays a step selecting screen for selecting the backlight step by a user.

On the other hand, if one of the predetermined keys, for example, one of the number keys, stored in Table 2 is input, the control unit 160 can control the brightness of the backlight in the backlight step corresponding to the input key in the backlight regulation mode. In other words, if the user inputs the number key 5 through the key input unit 140 in the backlight regulation mode, the brightness of the backlight is regulated to the brightness of the step 5 by the control unit 160.

It is preferable that the control unit 160 controls the portable terminal so that at least one of the currently regulated backlight steps and the backlight brightness values is displayed on the display unit 190 in order that the user can easily recognize the currently regulated backlight brightness.

The backlight regulating unit 165 regulates the backlight brightness of the display unit 190 according to the backlight brightness value output by the control unit 160. The backlight regulating unit 165 can be included in the control unit 160.

In the case in which the portable terminal 100 has a camera function, it can comprise the camera module 170.

The camera module 170 can comprise a lens unit (not shown) which can be inserted and withdrawn, and photographs image data.

Further, the camera module 170 comprises a camera sensor (not shown) for converting the photographed optical signals into electrical signals and a signal processing unit (not shown) for converting the analog image signals photographed by the camera sensor to digital data.

Here, the camera sensor is assumed to be a Charge Coupled Device (CCD) sensor, and the signal processing unit can be embodied with a Digital Signal Processor (DSP). The camera sensor and the signal processing unit can be embodied integrally or separately.

The image processing unit 180 generates screen data for displaying the image signals output in the camera module 170.

The image processing unit 180 processes the image signals output in the camera module 170 in frame unit and outputs the frame image data according to the characteristics and size of the display unit 190. Further, the image processing unit 180 comprises an image codec. The image processing unit 180 compresses the frame image data shown on the display unit 190 or restores the compressed frame image data to the original frame image data.

Further, the image processing unit 180 is assumed to have an On Screen Display (OSD) function and can output the OSD data according to the size of the screen displayed under the control of the control unit 160.

The display unit 190 can comprise a Liquid Crystal Display (LCD) and the like and outputs the display data generated in the portable terminal. Then, if the LCD is the touch screen type, the display unit 190 can be used as an input unit.

Further, the display unit 190 displays the image signals output in the image processing unit 180 and displays the user data output in the control unit 160.

Further, it is preferable that the display unit 190 comprise white light emitting diodes for the backlight function, and according to an exemplary embodiment of the present invention, the light emitting diodes are assumed to emit the light in the brightness of 150 cd to perform the backlight function unless they are otherwise adjusted by the user.

Figure 2:
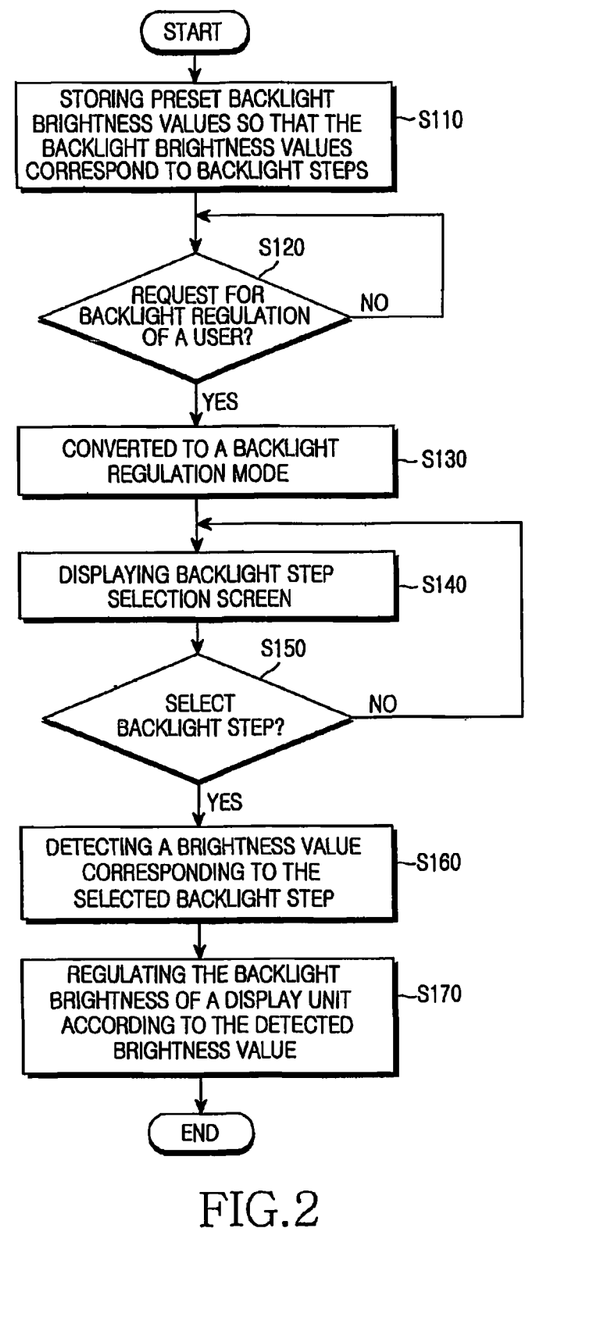
FIG. 2 is a flow chart illustrating the operation of a portable terminal according to an exemplary embodiment of the present invention.

FIG. 2 is a flow chart illustrating the operation of the portable terminal according to an exemplary embodiment of the present invention.

Referring to FIGS. 1 and 2, the control unit 160 matches the preset backlight brightness values to the backlight steps and stores them in the memory 150. It is preferable that when the control unit 160 associates the preset backlight brightness values to associated backlight steps and stores them in the memory 150 at step S110, they are stored in a table as in Table 1.

The control unit 160 examines whether there is a request for backlight regulation by the user, for example, a request through menu key input by the user. On the other hand, in an exemplary embodiment of the present invention, the backlight means the screen backlight brightness of the display unit 190 at step S120.

The control unit 160 converts the operation mode of the portable terminal 100 to the backlight regulation mode if there is the request for the backlight regulation at step S130.

If the operation mode of the portable terminal 100 is converted to the backlight regulation mode, the control unit 160 displays the backlight step selection screen for selecting a backlight step on the display unit 190 at step S140.

The control unit 160 checks whether a backlight step is selected on the basis of the selection information of the user at step S150.

If a backlight step is selected on the basis of the selection information of the user, the control unit 160 detects the brightness value corresponding to the selected backlight step from the memory 150 at step S160.

The control unit 160 regulates the backlight brightness of the display unit 190 by controlling the backlight regulating unit 165 according to the retrieved backlight brightness value at step S170 Then, the control unit 160 can display the backlight step or the brightness value on the display unit so that the user can easily recognize the currently regulated backlight brightness.

Figure 3:
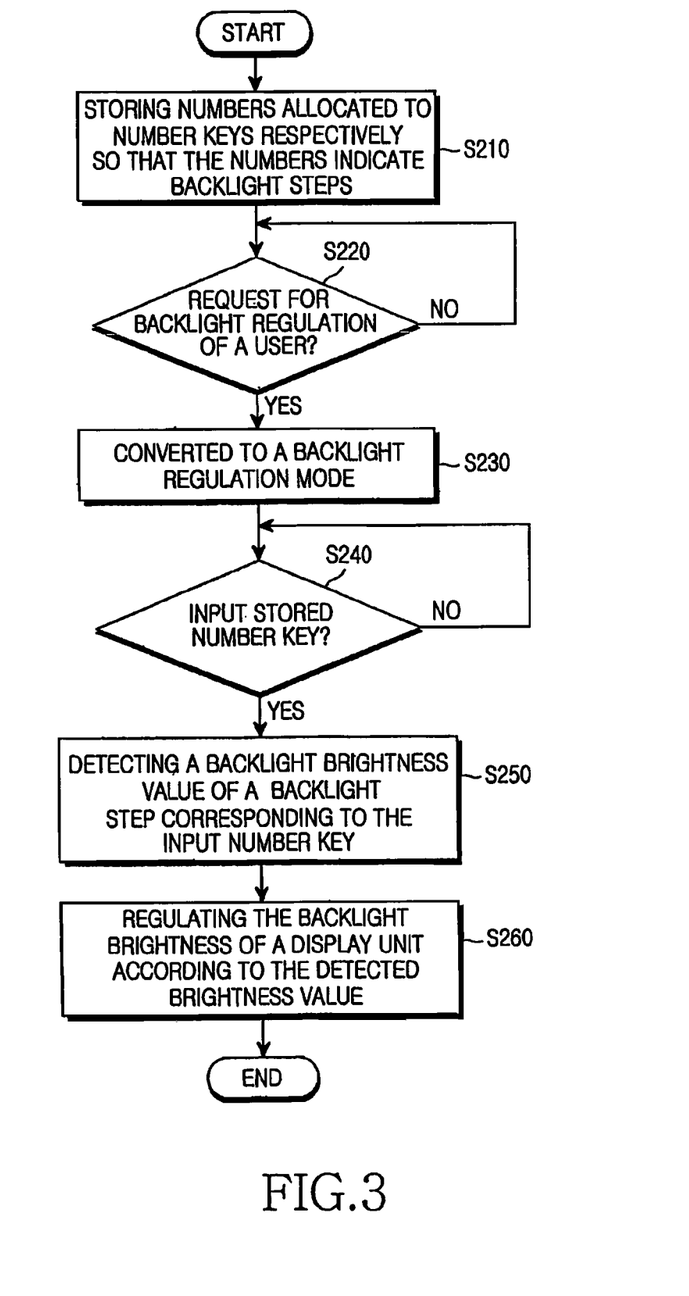
FIG. 3 is a flow chart illustrating the operation of a portable terminal according to an exemplary embodiment of the present invention.

FIG. 3 is a flow chart illustrating the operation of a portable terminal according to an exemplary embodiment of the present invention.

Referring to FIGS. 1 and 3, the control unit 160 assigns predetermined keys (for example, number keys) to the backlight steps having predetermined backlight brightness values and stores them in the memory 150 at step S210. Then, it is preferable that the numbers allocated to the number keys indicate the backlight steps.

The control unit 160 examines whether there is a request for the backlight regulation of the user, for example, a request through menu key input of the user at step S220.

If there is a request for backlight regulation, the control unit 160 converts the operation mode of the portable terminal 100 to the backlight regulation mode at step S230.

The control unit 160 determines whether the number keys, such as the number keys registered in Table 2, stored in the memory are input through the key input unit 140 at step S240.

If one of the number keys registered in Table 2 is input, the control unit 160 retrieves from memory the backlight brightness value of the backlight step corresponding to the input number key at step S250. For example, if the number key 5 to which the step 5 is allocated is input through the key input unit 140, the backlight brightness is regulated to the backlight brightness value that corresponds to the step 5.

The control unit 160 regulates the backlight brightness of the display unit 190 by controlling the backlight regulating unit 165 according to the detected backlight brightness value at step S260. Then, the control unit 160 can display the backlight step or the brightness value on the display unit so that the user can easily recognize the currently regulated backlight brightness.

Figure 4A:
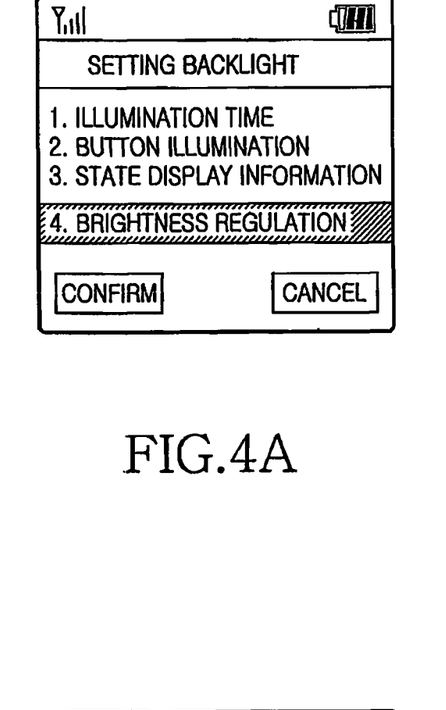
FIGS. 4A and 4B are exemplary views illustrating the operation of a portable terminal according to an exemplary embodiment of the present invention.
Figure 4B:
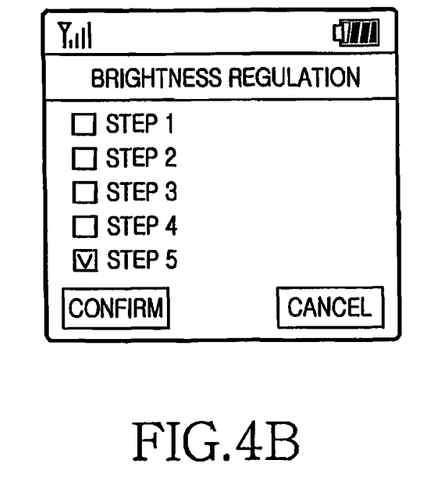

FIGS. 4Aa and 4B are exemplary views illustrating the operation of a portable terminal according to an exemplary embodiment of the present invention.

Hereinafter, FIGS. 4A and 4B will be explained with reference to FIGS. 1 to 3.

FIG. 4A shows a screen for requesting for backlight regulation of the portable terminal by a user.

If the user selects the "4. illumination brightness regulation" menu item in the screen of FIG. 4A through a direction key or other input and inputs the confirmation key, the portable terminal shows a screen for regulating the illumination brightness as shown in FIG. 4B.

In FIG. 4B, the backlight regulation steps comprise total five steps, and selection flags are provided in the front of the items representing the steps respectively so that the selected item can be checked whenever the backlight step is selected. In FIG. 4B, the user has selected the step 5.

On the other hand, it is preferable that the backlight of the display unit 190 is regulated to the brightness corresponding to the step selected by the user so that the user can recognize the backlight brightness corresponding to each step.

According to an exemplary embodiment of the present invention, the user can properly regulate the backlight of the portable terminal 100 according to the situation, and can reduce the consumption of the battery due to the user of the backlight of unnecessary brightness.

Although exemplary embodiments of the present invention describe the backlight brightness regulation of the display unit of the portable terminal, the present invention can be applied to the backlight regulation of a keypad. Further, while the invention has been shown and described with reference to certain preferred embodiments thereof, it will be understood by those skilled in the art that various changes in form and details may be made therein without departing from the spirit and scope of the invention as defined by the appended claims.

As mentioned above, the present invention can properly regulate the backlight brightness of a portable terminal, if necessary, by providing a portable terminal controlling the backlight and a method for controlling the backlight.

Further, since the present invention can regulate the backlight brightness at night so that the illumination intensity is low, battery consumption can be reduced.

What is claimed is:

1. An electronic device, comprising:
a display;
a memory; and
a processor configured to execute instructions stored in the memory to:
receive a first user input for controlling a brightness of the display,
based on the first user input, control the display to display an indicator item at a first position and control the brightness of the display to a first brightness step corresponding to the first position, the indicator item indicating a current brightness of the display,
when the indicator item is displayed at the first position, display a first numeric value corresponding to the first brightness step with the indicator item,
receive a second user input for changing the brightness of the display from the first brightness step corresponding to the first position,
based on the second user input, control the display to move the indicator item to a second position, which is different from the first position, and change the brightness of the display from the first brightness step to a second brightness step corresponding to the second position, and
when the indicator item is displayed at the second position, display a second numeric value corresponding to the second brightness step with the indicator item.

2. The electronic device of claim 1, wherein the brightness of the display includes a plurality of brightness steps being from a lowest brightness step to a highest brightness step.

3. The electronic device of claim 1, wherein an intermediate position corresponds to a brightness step between the first brightness step and the second brightness step.

4. The electronic device of claim 1, wherein each of the first user input and the second user input is a single user input.

5. The electronic device of claim 1, wherein the brightness of the display is changed from the first brightness step to the second brightness step based on a preset order.

6. The electronic device of claim 1, wherein the display includes touch screen display, and
wherein the processor is further configured to execute the instructions to:
receive a third user input for selecting the indicator item,
control the touch screen display to display the indicator item at a third position which is different from each of the first position and the second position, and
in response to displaying the indicator item at the third position, control the brightness of the touch screen display to a third brightness step corresponding to the third position.

7. An electronic device, comprising:
a display;
a memory; and
a processor configured to execute instructions stored in the memory to:
receive a first user input for controlling a brightness of the display,
based on the first user input, control the display to display an indicator item at a first position and control the brightness of the display to a first brightness value corresponding to the first position, the indicator item indicating a current brightness of the display, when the indicator item is displayed at the first position, display a first numeric value corresponding to the first brightness value with the indicator item, receive a second user input for changing the brightness of the display from the first brightness step corresponding to the first position, based on the second user input, control the move to display the indicator item to a second position, which is different from the first position, and change the brightness of the display from the first brightness step to a second brightness value corresponding to the second position, and when the indicator item is displayed at the second position, display a second numeric value corresponding to the second brightness value with the indicator item.

8. The electronic device of claim 7, wherein the brightness of the display includes a plurality of brightness values being from a lowest brightness value to a highest brightness value.

9. The electronic device of claim 7, wherein an intermediate position corresponds to a brightness value between the first brightness value and the second brightness value.

10. The electronic device of claim 7, wherein each of the first user input and the second user input is a single user input.

11. The electronic device of claim 7, wherein the processor is further configured to execute the instructions to, in direct response to receiving the first user input, control the display to display the indicator item in a predetermined area of the display.

12. The electronic device of claim 7, wherein the brightness of the display is changed from the first brightness value to the second brightness value based on a preset order.

13. The electronic device of claim 7, wherein the display includes touch screen display, and wherein the processor is further configured to execute the instructions to:

receive a third user input for selecting the indicator item, control the touch screen display to display the indicator item at a third position which is different from each of the first position and the second position, and in response to displaying the indicator item at the third position, control the brightness of the touch screen display to a third brightness step corresponding to the third position.

14. An electronic device, comprising:
a display;
a memory; and
a processor configured to execute instructions stored in the memory to:

receive a first user input, at a first positon, for controlling a brightness of the display, based on the first user input, control the display to display an indicator item with a first numeric value to indicate the first position and control the brightness of the display based on a first brightness step corresponding to the first position, the indicator item indicating a current brightness of the display, the first numeric value corresponding to the first brightness step, receive a second user input, at a second positon, for changing the brightness of the display from the first brightness step corresponding to the first position, and based on the second user input, control the display to move the indicator item with a second numeric value to indicate the second position, which is different from the first position, and change the brightness of the display from the first brightness step to a second brightness step corresponding to the second position, the second numeric value corresponding to the second brightness step.

15. The electronic device of claim 14, wherein the brightness of the display includes a plurality of brightness steps being from a lowest brightness step to a highest brightness step.

16. The electronic device of claim 14, wherein an intermediate position corresponds to a brightness step between the first brightness step and the second brightness step.

17. The electronic device of claim 14, wherein each of the first user input and the second user input is a single user input.

18. The electronic device of claim 14, wherein a shape of an outline and size of the indicator item displayed at the first position corresponds to the shape of the outline and the size of the indicator item displayed at the second position.

19. The electronic device of claim 14, wherein there is at least one intervening brightness step between the first brightness step and the second brightness step.

20. The electronic device of claim 1, wherein a shape of an outline and size of the indicator item displayed at the first position corresponds to the shape of the outline and the size of the indicator item displayed at the second position.

21. The electronic device of claim 1, wherein there is at least one intervening brightness step between the first brightness step and the second brightness step.

22. The electronic device of claim 7, wherein a shape of an outline and size of the indicator item displayed at the first position corresponds to the shape of the outline and the size of the indicator item displayed at the second position.

23. The electronic device of claim 7, wherein there is at least one intervening brightness value between the first brightness value and the second brightness value.

* * * * *